United States Patent
Schroers et al.

(10) Patent No.: US 12,367,544 B2
(45) Date of Patent: Jul. 22, 2025

(54) KERNEL-BASED FRAME INTERPOLATION FOR SPATIO-TEMPORALLY ADAPTIVE RENDERING

(71) Applicants: Disney Enterprises, Inc., Burbank, CA (US); ETH Zürich (EIDGENÖSSISCHE TECHNISCHE HOCHSCHULE ZÜRICH), Zürich (CH)

(72) Inventors: Christopher Richard Schroers, Uster (CH); Karlis Martins Briedis, Zurich (CH); Mark Meyer, Davis, CA (US); Ian McGonigal, London (GB); Abdelaziz Djelouah, Zurich (CH); Raphael François Otriz, Dübendorf (CH)

(73) Assignees: Disney Enterprises, Inc., Burbank, CA (US); ETH ZURICH (EIDGENÖSSISCHE TECHNISCHE HOCHSCHULE ZÜRICH), Zurich (CH)

( * ) Notice: Subject to any disclaimer, the term of this patent is extended or adjusted under 35 U.S.C. 154(b) by 333 days.

(21) Appl. No.: 18/197,366

(22) Filed: May 15, 2023

(65) Prior Publication Data
US 2024/0249381 A1  Jul. 25, 2024

Related U.S. Application Data

(60) Provisional application No. 63/440,871, filed on Jan. 24, 2023, provisional application No. 63/343,508, filed on May 18, 2022.

(51) Int. Cl.
*G06T 7/00* (2017.01)
*G06T 3/4007* (2024.01)
(Continued)

(52) U.S. Cl.
CPC .............. *G06T 3/4007* (2013.01); *G06T 5/50* (2013.01); *G06T 7/248* (2017.01); *G06T 7/90* (2017.01);
(Continued)

(58) Field of Classification Search
CPC . G06T 2207/10016; G06T 2207/20081; G06T 2207/20084; G06T 2207/20221;
(Continued)

(56) References Cited

U.S. PATENT DOCUMENTS

| 6,625,333 | B1* | 9/2003 | Wang | G06T 3/4007 382/173 |
|---|---|---|---|---|
| 2022/0038653 | A1* | 2/2022 | Reda | H04N 7/014 |
| 2022/0383573 | A1 | 12/2022 | Schroers et al. | |

OTHER PUBLICATIONS

Dong, Jiong, Kaoru Ota, and Mianxiong Dong. "Video frame interpolation: A comprehensive survey." ACM Transactions on Multimedia Computing, Communications and Applications 19.2s (2023): 1-31.*

(Continued)

*Primary Examiner* — Li Liu
(74) *Attorney, Agent, or Firm* — Farjami & Farjami LLP (57) ABSTRACT

A system includes a processor and a memory storing software code. The processor executes the software code to receive a first rendered image having first color and auxiliary buffers, receive a second rendered image having second color and auxiliary buffers, provide a third auxiliary buffer for an intermediate image to be interpolated, and identify one or more context features from each of the color buffers and the auxiliary buffers. The software code further interpolates, based on the context features, the intermediate image to provide an interpolated image, determines, based on the one or more context features from each of the first, second, and third auxiliary buffers, a rendering mask for producing one or more rendered sub-portions of the inter- (Continued)

mediate image, partially renders, using the rendering mask, the intermediate image to provide a partially rendered image, and blends the interpolated image and the partially rendered image to provide a composite image.

20 Claims, 6 Drawing Sheets (51) Int. Cl.
    *G06T 5/50*     (2006.01)
    *G06T 7/246*    (2017.01)
    *G06T 7/90*     (2017.01)

(52) U.S. Cl.
    CPC .............. *G06T 2207/10016* (2013.01); *G06T 2207/10024* (2013.01); *G06T 2207/20081* (2013.01); *G06T 2207/20084* (2013.01); *G06T 2207/20221* (2013.01)

(58) Field of Classification Search
    CPC ......... G06T 3/4007; G06T 7/248; G06T 7/20; G06T 2207/10024; G06T 7/215; G06T 7/90; H04N 7/014; H04N 19/537
    See application file for complete search history.

(56) References Cited

OTHER PUBLICATIONS

Karlis Martins Briedis, Abdelaziz Djelouah, Mark Meyer, Ian McGonical, Markus Gross, Christopher Schroers "Neural Frame Inetrpolation for Rendered Content" ACM Trans. Graph., vol. 40., No. 6, Article 239. Dec. 2021 13 Pgs.

Olaf Ronneberger, Philipp Fischer, Thomas Brox "U-Net: Convolution Networks for Biomedical Image Segmentation" Medical Image Computing and Computer-Assisted Intervention Nov. 18, 2015 8 Pgs.

* cited by examiner

ALGORITHM 1: Rendering region selection

--- to_render ← {first_frame : $full()$, last_frame : $full()$}
q ← $Queue\{(first\_frame, last\_frame)\})$
while q *not empty* do
    lb, ub ← q.$pop()$
    mid ← $round((lb + ub)/2)$
    q.$push\_if\_nonzero((lb, mid))$
    q.$push\_if\_nonzero((mid, ub))$
    keyframe_distance ← $max(mid - lb, ub - mid)$
    render_mask = $where(interval_{mid} < keyframe\_distance)$
    render_mask = $gaussian\_blur(render\_mask, \sigma = 1.0) \geq 0.05$
    render_mask = $tiles\_with\_any\_pixel(render\_mask)$
    if $mean(render\_mask) \geq 95\%$ then
        render_mask = $full()$
    end
    to_render[mid] = render_mask
end
return to_render

KERNEL-BASED FRAME INTERPOLATION FOR SPATIO-TEMPORALLY ADAPTIVE RENDERING

RELATED APPLICATIONS

The present application claims the benefit of and priority to pending Provisional Patent Application Ser. No. 63/343,508 filed on May 18, 2022, and titled "Frame Interpolation with Kernel Prediction, Flow Fusion, and Temporal Adaptivity," which is hereby incorporated fully by reference into the present application. The present application also claims the benefit of and priority to pending Provisional Patent Application Ser. No. 63/440,871 filed on Jan. 24, 2023, and titled "Frame Interpolation with Kernel Prediction and Spatio-Temporal Adaptivity," which is hereby also incorporated fully by reference into the present application.

BACKGROUND

Due to the ever increasing demand for high quality rendered content, there is an ongoing effort to reduce the very high costs associated with Monte Carlo renderings. Existing methods for reducing these costs include image denoising and adaptive sampling, neither of which leverages the redundancies present across multiple frames. A more recent approach for re-using information across multiple frames is based on rendered image interpolation or extrapolation, where the renderer produces a temporally down-sampled sequence from which the missing frames are reconstructed. Despite this progress, challenges remain.

For example, in a production context, frame interpolation cannot be limited to the final color. Other feature channels (e.g., alpha channel, decomposed per light contributions) also need to be interpolated, and the result must remain consistent between all channels in order to be used in subsequent processing such as compositing. Most of the existing video frame interpolation approaches employ a direct or residual prediction neural network for the final frame synthesis, which must be retrained for every channel combination despite being unable to provide any guarantee for aligned outputs. Moreover, direct prediction networks with their unconstrained output range can undesirably produce color artifacts. Thus, there remains a need in the art for a frame interpolation solution capable of providing high quality results reliably, at acceptable cost.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals.

Following the recent advances and quality improvements of video frame interpolation, additional applications have emerged, one being interpolation of rendered content for reducing rendering time and costs. In this setting, additional inputs, such as albedo and depth, can be extracted from the scene at a very low cost while significantly helping the interpolation. While the existing approaches work well, most high-quality interpolation methods use a synthesis network for the interpolated color value prediction, limiting applications and occasionally suffering from unpredictable behavior.

The present application discloses systems and methods for performing frame interpolation by predicting spatially varying kernels that operate on image splats. Kernel prediction advantageously ensures a linear mapping from the input images to the output and enables new opportunities, such as consistent and efficient interpolation of alpha values or many other additional channels and render passes that might exist. The present application also discloses a flow fusion approach that is robust to typical problems that occur in motion vector fields generated by a production renderer. While inputting such motion information in a naive way degrades the interpolation quality, it is shown herein that the present flow fusion approach is able to increase quality. In addition an adaptive strategy is presented that allows predicting keyframes that should be rendered with color samples solely based on the auxiliary features of a shot. This adaptivity based on the content allows rendering significantly fewer color pixels as compared to a fixed scheme while maintaining a desired quality level. Overall, these contributions lead to a more robust method, improved interpolation quality as well as a further reduction in rendering costs.

The frame interpolation solution disclosed by the present application advances the state-of-the-art in several ways. For example, the present solution improves interpolation quality by robustly utilizing motion vectors provided by the renderer, even when they are unreliable for complex scenes, while also improving numerical stability with log-space forward warping, i.e., log-space splatting. In addition, the present solution is able to consistently interpolate an arbitrary number of channels (e.g., alpha) without adapting the method, and increases robustness by interpolating with kernels. The present solution also advantageously enables increasing the gap between frames that need to be fully rendered by introducing an adaptive interpolation strategy. Furthermore, it is noted that the present frame interpolation solution can be implemented as substantially automated systems and methods.

It is noted that, as used in the present application, the terms "automation," "automated," and "automating" refer to systems and processes that do not require the participation of a human user, such as a human editor or system administrator. Although, in some implementations, a human system administrator may review the performance of the automated systems operating according to the automated processes described herein, that human involvement is optional. Thus, the processes described in the present application may be performed under the control of hardware processing components of the disclosed systems.

It is further that, as defined in the present application, an artificial neural network, also known simply as a neural network (NN), is a type of machine learning model in which patterns or learned representations of observed data are processed using highly connected computational layers that map the relationship between inputs and outputs. Moreover, a "machine learning model" refers to a mathematical model for making future predictions based on patterns learned from samples of data obtained from a set of trusted known matches and known mismatches, known as training data. Various learning algorithms can be used to map correlations between input data and output data. These correlations form the mathematical model that can be used to make future predictions on new input data. Such a predictive model may include one or more logistic regression models, Bayesian models, or NNs, for example. In addition, machine learning models may be designed to progressively improve their performance of a specific task.

A "deep neural network" (deep NN), in the context of deep learning, may refer to a NN that utilizes multiple hidden layers between input and output layers, which may allow for learning based on features not explicitly defined in raw data. As used in the present application, a feature labeled as a NN refers to a deep neural network. In various implementations, NNs may be utilized to perform image processing or natural-language processing.

Figure 1:
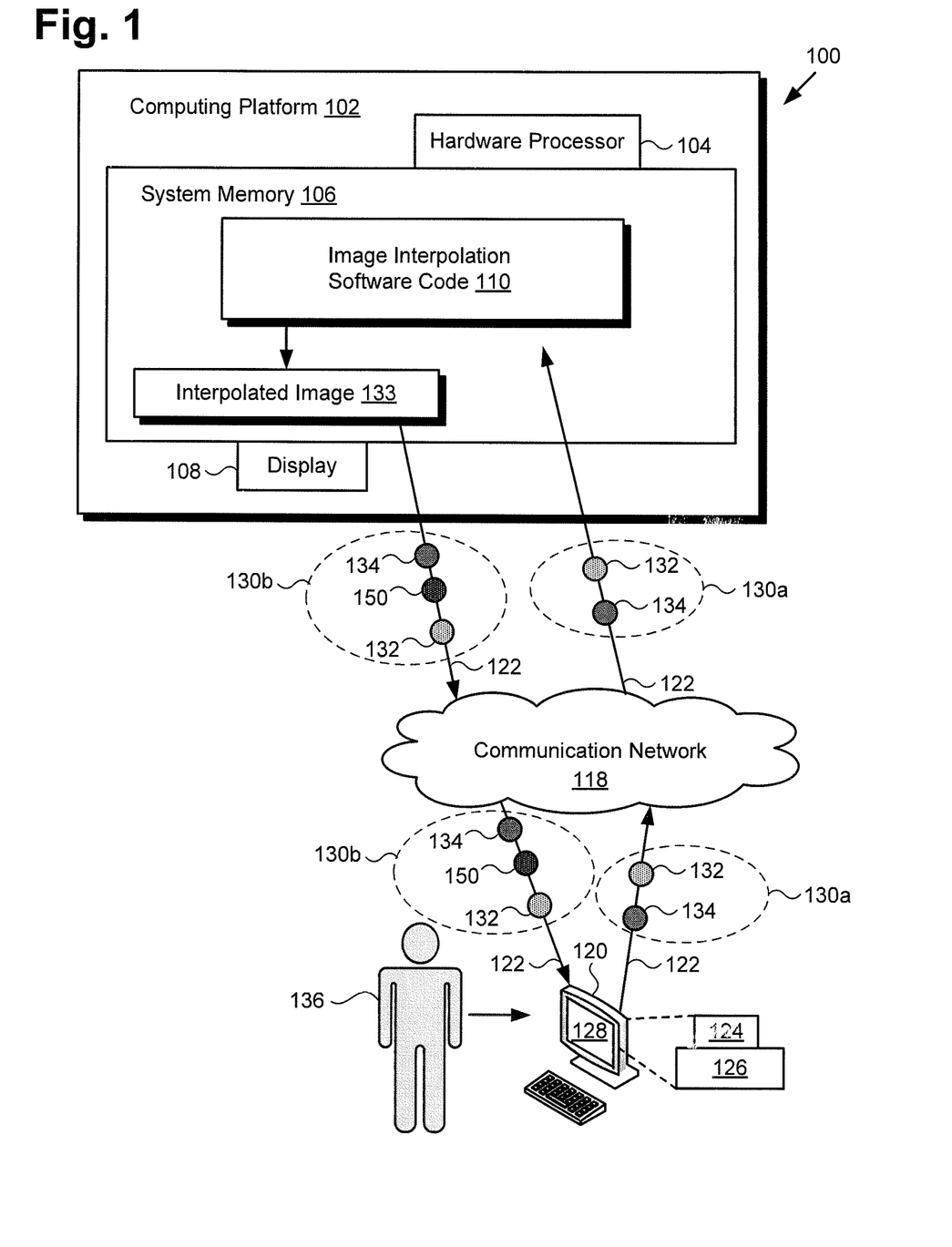
FIG. 1 shows a system for performing kernel-based frame interpolation for spatio-temporally adaptive rendering, according to one implementation.

FIG. 1 shows an exemplary system for performing kernel-based frame interpolation for spatio-temporally adaptive rendering, according to one implementation. As shown in FIG. 1, system 100 includes computing platform 102 having hardware processor 104, system memory 106 implemented as a computer-readable non-transitory storage medium, and display 108. According to the present exemplary implementation, system memory 106 stores image interpolation software code 110.

As further shown in FIG. 1, system 100 is implemented within a use environment including communication network 118, user system 120 including user system hardware processor 124, user system memory 126, and display 128, as well as user 136 utilizing user system 120. It is noted that display 108 of system 100, as well as display 128 of user system 120, may be implemented as a liquid crystal display (LCD), a light-emitting diode (LED) display, an organic light-emitting diode (OLED) display, a quantum dot (QD) display or another suitable display screen that performs a physical transformation of signals to light.

FIG. 1 further shows network communication links 122 interactively connecting user system 120 and system 100 via communication network 118, image sequence 130a, such as a video sequence for example, including first and second rendered images 132 and 134, which may be consecutive rendered video frames in the original content of image sequence 130a. Also shown in FIG. 1 is image sequence 130b including first and second rendered images 132 and 134, and composite image 150 produced using image interpolation software code 110 and inserted between first and second rendered images 132 and 134.

It is noted that image sequences 130a and 130b may contain any of a variety of different types and genres of audio-video (AV) content, as well as to video unaccompanied by audio. Specific examples of AV content include content in the form of movies, TV episodes or series, podcasts, streaming or other web-based content, video games, and sporting events. In addition, or alternatively, in some implementations, content carried by image sequences 130a and 130b may be or include digital representations of persons, fictional characters, locations, objects, and identifiers such as brands and logos, for example, which populate a virtual reality (VR), augmented reality (AR), or mixed reality (MR) environment. Moreover, that content may depict virtual worlds that can be experienced by any number of users synchronously and persistently, while providing continuity of data such as personal identity, user history, entitlements, possessions, payments, and the like. It is noted that the concepts disclosed by the present application may also be applied to content that is a hybrid of traditional AV and fully immersive VR/AR/MR experiences, such as interactive video.

Although the present application refers to image interpolation software code 110 as being stored in system memory 106 for conceptual clarity, more generally system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

Moreover, although FIG. 1 depicts image interpolation software code 110 as being stored in its entirety in system memory 106, that representation is also provided merely as an aid to conceptual clarity. More generally, system 100 may include one or more computing platforms 102, such as computer servers for example, which may be co-located, or may form an interactively linked but distributed system, such as a cloud-based system, for instance. As a result, hardware processor 104 and system memory 106 may correspond to distributed processor and memory resources within system 100.

Hardware processor 104 may include multiple hardware processing units, such as one or more central processing units, one or more graphics processing units, one or more tensor processing units, one or more field-programmable gate arrays (FPGAs), and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as image interpolation software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

According to the implementation shown by FIG. 1, user 136 may utilize user system 120 to interact with computing platform 102 of system 100 over communication network 118. In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. In addition, or alternatively, in some implementations, system 100 may utilize a local area broadcast method, such as User Datagram Protocol (UDP) or Bluetooth, for instance. Furthermore, in some implementations, system 100 may be implemented virtually, such as in a data center. For example, in some implementations, system 100 may be implemented in software, or as virtual machines. Moreover, in some implementations, communication network 118 may be a high-speed network suitable for high performance computing (HPC), for example a 10 GigE network or an Infiniband network.

Although user system 120 is shown as a desktop computer in FIG. 1, that representation is provided merely as an example. More generally, user system 120 may be any suitable mobile or stationary computing device or system that implements data processing capabilities sufficient to provide a user interface, support connections to communication network 118, and implement the functionality ascribed to user system 120 herein. For example, in some implementations, user system 120 may take the form of a laptop computer, tablet computer, smartphone, or game console, for example. However, in other implementations user system 120 may be a "dumb terminal" peripheral component of system 100 that enables user 136 to provide inputs via a keyboard or other input device, as well as to view video content via display 128. In those implementations, user system 120 and display 128 may be controlled by hardware processor 104 of system 100.

With respect to display 128 of user system 120, display 128 may be physically integrated with user system 120 or may be communicatively coupled to but physically separate from user system 120. For example, where user system 120 is implemented as a smartphone, laptop computer, or tablet computer, display 128 will typically be integrated with user system 120. By contrast, where user system 120 is implemented as a desktop computer, display 128 may take the form of a monitor separate from user system 120 in the form of a computer tower.

The functionality of system 100 and image interpolation software code 110 are further described below by reference to FIGS. 2, 3A, 3B, and 4. By way of overview, given two consecutive rendered images $I_0$ and $I_1$, the objective of a frame interpolation method is to synthesize any intermediate image $I_t$ (with $t \in [0, 1]$). In contrast to live action videos, where only color information from the images is available, frame interpolation in the rendered context can benefit from additional data $A_i$ that is computationally cheap and easy to obtain (i.e., less compute than rendering the actual intermediate image).

Figure 2:
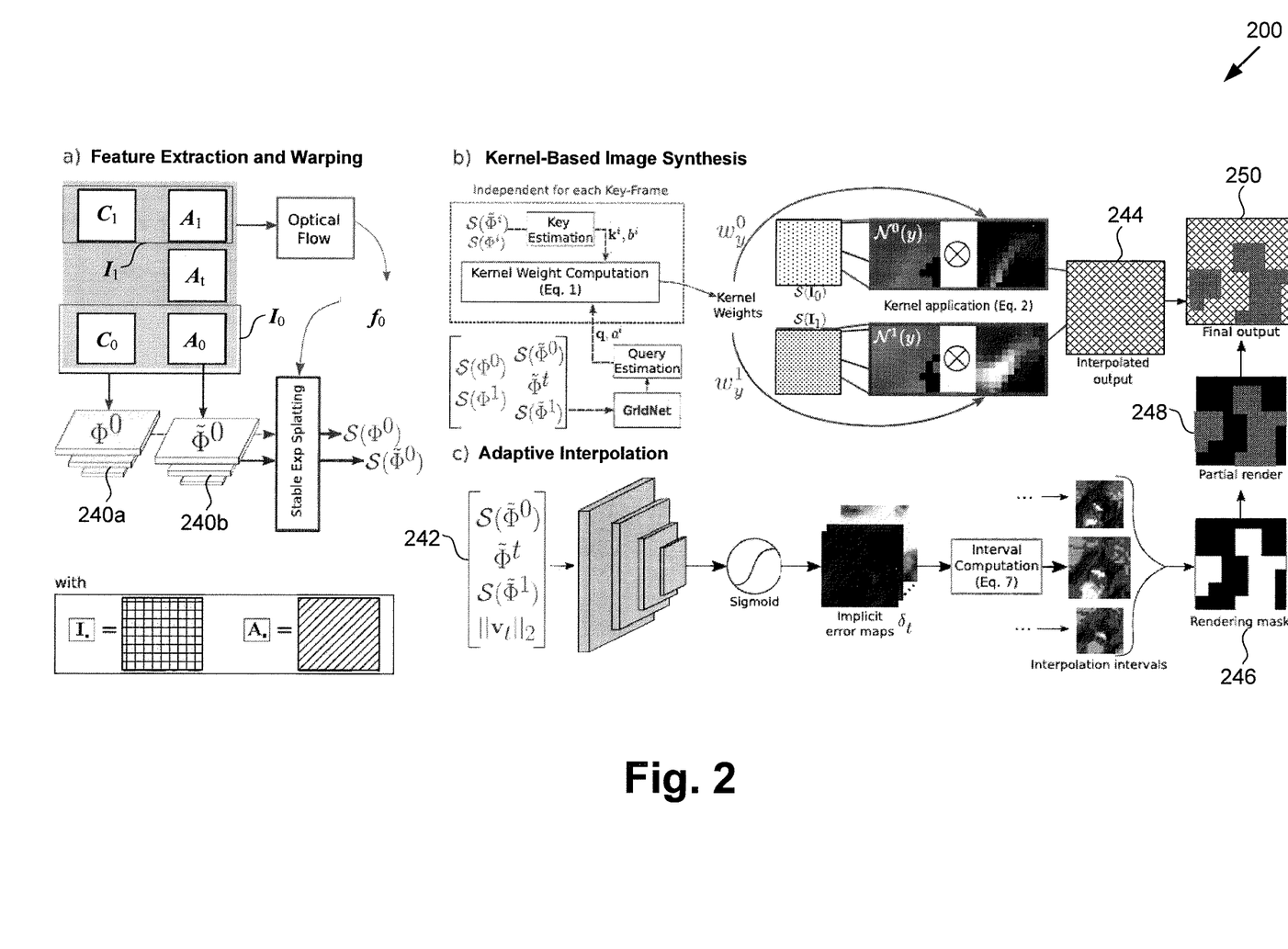
FIG. 2 illustrates an overview of a process for performing kernel-based frame interpolation for spatio-temporally adaptive rendering, according to one implementation.
Figure 3:
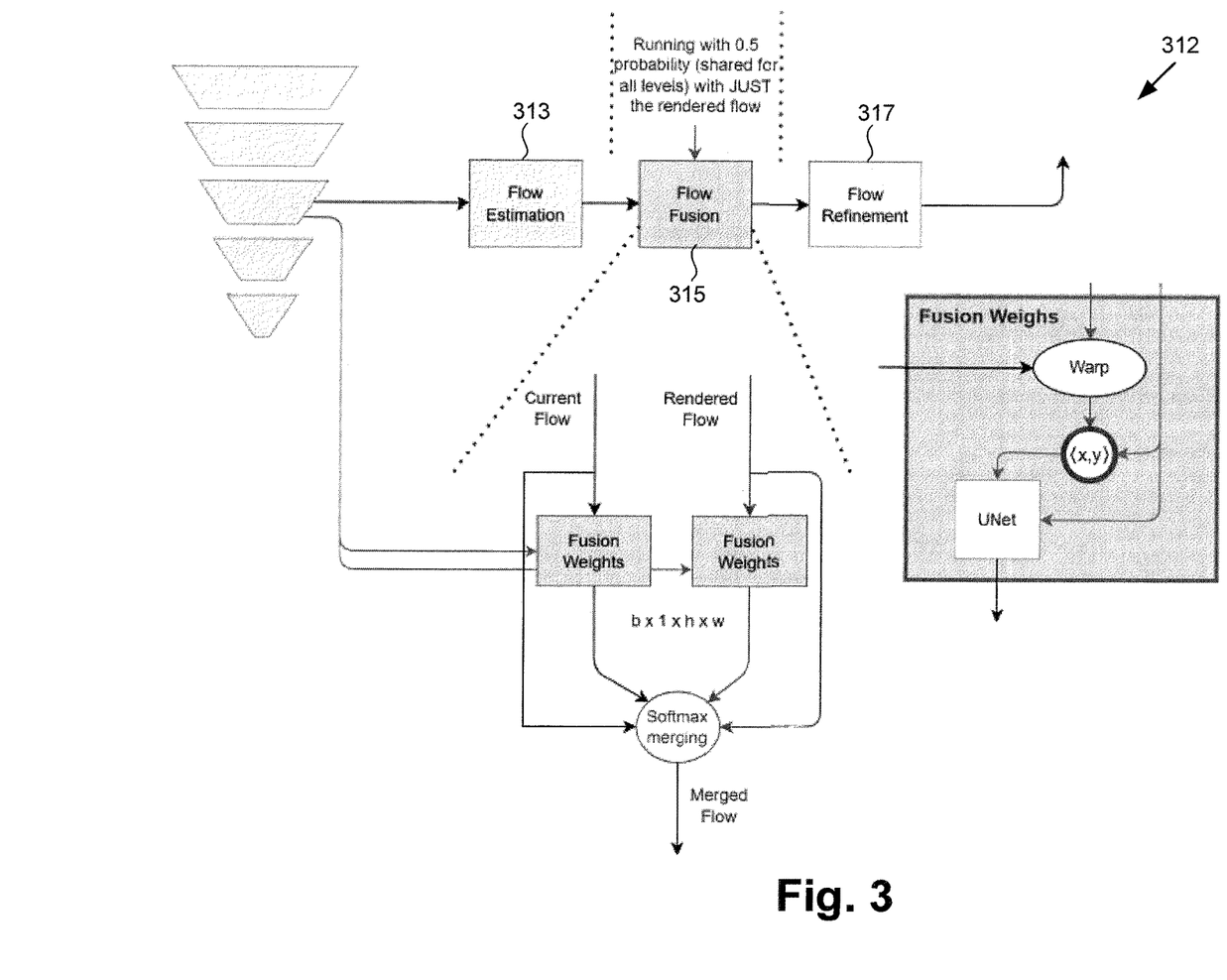
FIG. 3 shows a diagram of an exemplary optical flow estimation block suitable for use by the system shown in FIG. 1, according to one implementation.

FIG. 2 illustrates overview 200 of a process for performing kernel-based frame interpolation for spatio-temporally adaptive rendering, according to one implementation. It is noted that although the process depicted in FIG. 2 is for a single rendered image $I_0$ having color buffer $C_0$ and auxiliary buffer $A_0$, a similar process is performed for the next rendered image in the image sequence ($I_1$), that next rendered image $I_1$ having another color buffer $C_1$ and another auxiliary buffer $A_1$. As known in the art, a color buffer includes the information needed for image rendering, while auxiliary buffers are those that are inexpensive to obtain, such as albedo, depth, and surface normal for example.

According to the present concepts, frame interpolation may be divided into three main stages: feature extraction and warping shown in section a) of FIG. 2, kernel-based image synthesis shown in section b) of FIG. 2, and adaptive interpolation shown in section c) of FIG. 2. As shown in section a) of FIG. 2, context features $\Phi^0$ and $\tilde{\Phi}^0$ are extracted from respective color buffer $C_0$ and auxiliary buffer $A_0$ of rendered image $I_0$ by respective neural networks (NNs) 240a and 240b, and optical flow $f_0$ for splatting context features $\Phi^0$ and $\tilde{\Phi}^0$ is computed. As shown in section b) of FIG. 2, splatted features $S(\Phi^i)$, $S(\tilde{\Phi}^i)$ are used to estimate kernels for the final frame synthesis. As shown in section c) of FIG. 2, learned features 242 including $\tilde{\Phi}^t$, $\|v_t\|_2$, and splatted features $S(\Phi^0)$ and $S(\tilde{\Phi}^1)$, all extracted from the auxiliary buffers $A_i$, also using NNs, are used to estimate implicit error maps, interpolation intervals, and regions to render. Finally, interpolated image 244 is blended with partially rendered image 248 produced using rendering mask 246 to provide composite image 250. The processes illustrated by sections a), b), and c) of FIG. 2 are described in greater details below.

Feature Extraction and Warping:

With respect to optical flow estimation, a significant distinction of the present interpolation solution is the possibility to leverage motion vectors produced by the renderer. This is not a straightforward process because displacement information provided by the renderer can be incorrect or missing. It is noted that information relevant to the present concepts are described in the disclosure provided by U.S. patent application Ser. No. 17/325,026, filed on May 19, 2021, and titled "Frame Interpolation for Rendered Content," which is hereby incorporated fully by reference into the present application. In addition, the entire disclosure of the following paper is hereby incorporated fully by reference into the present application:

Karlis Martins Briedis, Abdelaziz Djelouah, Mark Meyer, Ian McGonigal, Markus Gross, and Christopher Schroers. 2021. Neural Frame Interpolation for Rendered Content. ACM Trans. Graph. 40, 6, Article 239 (December 2021), 13 pages. https://doi.org/10.1145/3478513.3480553 (hereinafter referred to as "Briedis et al. 2021").

An important component of flow-based interpolation methods is the optical flow network for correspondence matching between rendered images $I^0$ and $I^1$. While most rendering engines are able to output the motion vectors for the objects in the scene, often they are very unreliable for complex sequences such as those with semi-transparent objects, motion blur, and volumetric effects. Because of this, prior methods have used optical-flow-based motion estimation networks, completely discarding the rendered motion vectors and not benefiting from them even when they contain useful information.

One major challenge for the straightforward use of such motion vectors as additional inputs in the optical flow estimation network is the optical flow pre-training. In this stage the objective for the network is to match the ground truth vector, but the problem is that no other motion vectors are available and if the same inputs are used as input, an optimal network would learn to output identity. Although it is possible to utilize different augmentation techniques, it is difficult to match the distribution of the data provided by the renderer.

To overcome that challenge, the present frame interpolation solution uses a semi-standalone flow processing block that merges multiple flow candidates into one. One exemplary implementation of such a block is shown as optical flow estimation block 312, in FIG. 3, and may include flow estimation 313, flow fusion 315, and flow refinement 317. It is noted that optical flow estimation block 312 may be implemented as a feature of image interpolation software code 110, can be used anywhere in the optical flow pipeline, and can be optionally skipped when no rendered motion vectors are available during inference. The flow estimation network from Briedis et al. 2021 incorporated by reference above may be utilized, and optical flow estimation block 312 may be run in every pyramid level of the optical flow method before flow refinement, using the current flow estimate of the network and downsampled motion vectors.

For each flow candidate, a weight may be assigned based on its estimated quality according to:

$$w(f^i) = NN\left(\Phi_0, \hat{\Phi}_0, \overleftarrow{W}_{f^i/t}(\Phi_1), \overleftarrow{W}_{f^i}(\hat{\Phi}_t)\right), \quad \text{(Equation 1)}$$

where $\Phi_j$, $\hat{\Phi}_j$ are the full and partial feature representation of the inputs at time j, $\overleftarrow{W}_b$ (a) is backward warping of a with b, $f^i$ is the i-th flow candidate, and NN is a neural network, e.g., a U-Net, as known in the art.

The merged flow at pixel x may be computed with a softmax function, i.e., a normalized exponential function that converts a vector of an integer number "K" of real numbers into a probability distribution of K possible outcomes, on the estimated weights:

$$\hat{f}_x = \frac{\sum_i e^{w(f^i)_x} f_x^i}{\sum_i e^{w(f^i)_x}} \quad \text{(Equation 2)}$$

As the flow fusion network can be dynamically disabled by skipping flow fusion 315 in FIG. 3 and directly connecting flow estimation 313 with flow refinement 317, it is possible to optionally pre-train the other parts of optical flow estimation network on synthetic data, and then train the fusion network together with frame interpolation and the implicit interpolation supervision, optionally also supervising with another pre-trained optical flow network.

Instead of using full input feature pyramids, scale-agnostic pyramids can be used for better generalization, as well as a dynamic number of pyramids depending on the image size to support a larger magnitude of motion than may have been seen during training. As known in the art, a scale agnostic pyramid is a feature pyramid, where only, for example, the top 3 levels are extracted by a NN and the lower levels are extracted from a down sampled image. One downside of using more than, for example seven pyramid levels, is the possibility of predicting excessively large motion on the lower levels of estimation and that cannot be recovered from on the higher levels. This could be mitigated by fusing with "zero" flow on each level, thereby always being able to recover from overshot estimations.

In order to perform motion compensations, information from the rendered images needs to be warped according to the estimated motion. Forward warping can be used for this and a key problem becomes the estimation of the weight map to handle mapping ambiguities. A different splatting formulation is disclosed herein that resolves existing numerical instability issues. After splatting all the features, a compositing model predicts the output image $I_t$. In contrast to conventional approaches to frame interpolation, the present solution predicts linear kernels for intermediate frame synthesis.

First, to obtain high quality image warps with no shifted values, the present approach utilizes log-space splatting as a numerically stable formulation for forward warping. That may be followed by a kernel prediction layer that estimates spatially varying kernels. Although the straightforward solution would be to directly predict weights for dense or separable kernels, the present interpolation solution uses dynamically generated kernels in which the kernel weights are estimated dynamically according to Equation 6 below, in order to be able to adjust the kernel size during the inference.

When performing motion compensation with forward warping, also known as splatting, each pixel in the source image is added to the target, by using weighted averaging to handle mapping ambiguities. Formally, the value of the splatted image I for an output location y on the image plane $\Omega$ can be defined as:

$$\overrightarrow{W}_f(I)[y] = \left(\sum_{x \in \Omega} w(x, y) \cdot I[x]\right) \cdot \left(\sum_{x \in \Omega} w(x, y) + \varepsilon\right)^{-1} \quad \text{(Equation 3a)}$$

$$w(x, y) = W[x] \cdot k(x + f[x] - y) \quad \text{(Equation 3b)}$$

with a given per-pixel weighting map W and kernel k, centered around the displacement location x+f[x].

If implemented exactly as described above, several numerical issues can arise when the sum of weights $\sum_{x \in \Omega} w(x,y)$ is very large or very small. For large weights, e.g., when using softmax splatting, the output is affected by the floating point arithmetic round off error. For small weights, e.g., when the output location is far from any displacement center and all (*)<<1, in addition to the round off error the normalization has a non-negligible value shift from the $\varepsilon$ factor that is used to prevent division by zero. To resolve both issues, the translational invariance property of softmax may be used, to rewrite Equations (3a) and (3b) above as a softmax splatting of shifted log weights as:

$$\overrightarrow{W}_f(I)[y] = \left(\sum_{x \in \Omega} w^*(x, y) \cdot I[x]\right) \cdot \left(\sum_{x \in \Omega} w^*(x, y) + \varepsilon\right)^{-1} \quad \text{(Equation 4a)}$$

$$w^*(x, y) = \exp(\log(w(x, y)) - m(x, y)) \quad \text{(Equation 4b)}$$

$$m(y) = \max_{x \in \Omega} \log(w(x, y)) \quad \text{(Equation 4c)}$$

Subtracting the maximum term ensures that:

$$\max_{x \in \Omega} w^*(x, y) = \exp(0) = 1 \quad \text{(Equation 5a)}$$

$$1 \leq \sum_{x \in \Omega} w^*(x, y) \leq |\Omega| \quad \text{(Equation 5b)}$$

for every pixel y with at least a single non-zero weight contribution, making the division stable and unaffected by the $\varepsilon$. This also helps to ensure that the output is a true linear combination of the inputs. In practice, this process can be implemented in two passes. In the first pass m(y) may be estimated for each target pixel y by performing maximum forward warping. In the second pass shifted softmax splatting may be performed in which softmax splatting is "shifted" by subtracting the maximum term, as shown by Equation 4. It is noted that the approach disclosed herein is not limited to the softmax weighting scheme, supports any non-negative weight map W, and is stable even for small splatting kernel coefficients.

Kernel-Based Image Synthesis:

To extend the possible applications of frame interpolation methods for rendered content, a kernel-predicting synthesis network is disclosed that is used to obtain the final output from forward-warped inputs. As both the warping process and kernel application compute a linear combination of the inputs, sharing the coefficients across all the channels has several practical benefits over existing approaches. For example, according to the present novel and inventive approach, a set of kernels can be estimated once and applied to an unlimited number of additional feature channels, e.g., alpha channel, with small additional cost, consistent results, and without a need to re-train the method for each of the different channels. In addition, according to the present approach, interpolation can be performed before and after image composition while maintaining the same outputs. Moreover, because the output is limited to the convex hull of the input colors, the resulting images are well constrained without colorful artifacts. In other words, according to the present implementation, being in the convex hull means that every output pixel is a weighted average of the input pixels, thus minimum/maximum values are preserved.

The dynamic kernel prediction network used in the present frame interpolation solution may be implemented using a GridNet that takes as input motion compensated feature pyramids and outputs a multi-dimensional representation, such as a 16-dimensional or 18-dimensional representation for example, of the interpolated image (initial estimation). According to the present approach this initial estimation serves as query data in an attention-inspired mechanism and is expected to act as a reference to the missing image and aide in the kernel estimation.

In order to perform kernel weight prediction, an attention-inspired mechanism is utilized to predict per-pixel keys, queries, and scaling coefficients. Those are then used for a size-independent kernel estimation. The output of the Grid-Net may be decomposed into a number of queries $q \in \mathbb{R}^{H \times W \times D}$, where D=16 is the per-pixel vector size, and $a^i \in \mathbb{R}^{H \times W \times 1}$ the scaling for each rendered image $i \in \{0,1\}$. Keys $k^i \in \mathbb{R}^{H \times W \times D}$ and biases $b^i$, which are predicted values used in Equation 6, are estimated from the splatted feature pyramids $\Phi^i$ and $\tilde{\Phi}^i$ for each rendered image separately with another two 1×1 convolution layers.

With the estimated coefficients and feature maps, the weighting score w is computed. For each output pixel y, the relevance weight to any other pixel x in warp i is estimated with:

$$w_{yx}^i = -(a_y^i)^2 \|q_y - k_x^i\|_2 + b_x^i \qquad \text{(Equation 6)}$$

It is noted that the predicted scaling factor is squared in Equation 6 to constrain the weighting to be inversely proportional to the feature distance. The bias term allows down-weighting contributions from pixels in splats that can be viewed as outliers.

With the weighting metric established as described above, a local kernel can be built by limiting the distance between y and x to the neighborhood N around the center y, e.g., maximum of 5 pixel displacement for kernels of size 11×11. The output $\hat{I}_t$ is synthesized as:

$$\hat{I}_t[y] = \frac{\sum_i^N \sum_{x \in N(y)} M_x^i \exp(w_{yx}^i) S(I_i)[x]}{\sum_i^N \sum_{x \in N(y)} M_x^i \exp(w_{yx}^i) + \varepsilon} \qquad \text{(Equation 7)}$$

where N=2 is the number of input images and $M^i \in \{0,1\}^{H \times W}$ is a binary map that indicates holes in the warped images.

One significant advantage of the present approach is that N can be dynamically adjusted during inference to increase the perceptual window with bigger or dilated kernels, which is important to inpaint larger holes that would be challenging for directly predicted kernels with static size.

In practice, it is sufficient to estimate kernels with large offsets only in regions with holes in the splats. To that end, a dynamic per-pixel kernel size estimation and application is introduced. The offset γ is defined the minimum offset such that at least Γ contributing pixels are present:

$$\gamma = \underset{\gamma'}{\arg\min} \, \Gamma \leq \sum_{x \in \eta(y, \gamma')} M_x^i \qquad \text{(Equation 8)}$$

which can be used to define the pixel neighborhood $$N^i(y) = \{x \in \eta(y, \gamma) \mid M_x^i = 1\} \qquad \text{(Equation 9a)}$$

$$\eta(y', \gamma') = \{x \mid \|y' - x\|_\infty \leq \gamma'\} \qquad \text{(Equation 9b)}$$

During training, a constant displacement, e.g., γ=5, may be used, but during inference the offset γ may be dynamically adapted to ensure Γ=11² contributing pixels.

A naive implementation would compute Equation (7) and its partial derivatives with respect to inputs in a single kernel call. However, in some implementations it may be advantageous or desirable to balance performance with operator flexibility and implementational complexity by disentangling per-frame weighted sum computations and relying on auto-differentiation. To achieve that outcome, Equation 7 can be re-written by taking the factor $r_i(y)$ outside of the inner sums as:

$$\hat{I}_t[y] = \frac{\sum_i^N \sum_{x \in N^i(y)} \hat{w}_{yx}^i S(I_i)[x] r_i(y)}{\sum_i^N \left( \sum_{u,v \in N(m,n)} \hat{w}_{yx}^i \right) r_i(y)} \qquad \text{(Equation 10a)}$$

$$\hat{w}_{yx}^i = \exp(w_{yx}^i - m_i(y)) \qquad \text{(Equation 10b)}$$

$$r_i(y) = \exp\left(m_i(y) - \max_{i \in 1...N} m_i(y)\right) \qquad \text{(Equation 10c)}$$

$$m_i(y) = \max_{x \in N^i(y)} w_{yx}^i \qquad \text{(Equation 10d)}$$

This enables the computation and output of three simpler quantities for each of the frames:

$$\sum_{x \in N^i(y)} \hat{w}_{yx}^i S(I_i)[x]$$

$$\sum_{x \in N(y)} \hat{w}_{yx}^i$$

$$m_i(y)$$

that are all numerically stable due to the subtraction of the largest weight exponentiation, and can be recombined by applying Equations 10(a)-10(d) on dense tensors to obtain the original values.

Adaptive Interpolation:

While on average the interpolation quality degrades with the number of skipped frames and increased temporal gaps, the error is often concentrated on relatively small and fast-moving objects while a nearly static or slowly drifting background is correctly interpolated. To benefit from that observation, spatio-temporally adaptive interpolation, where the gap between input images is chosen dynamically per pixel or tile is introduced herein, in which a choice to render or not to render can be made per pixel or tile in the sequence, instead of full images. This significantly improves the interpolation quality while rendering the same number of pixels.

One possible approach is to utilize only two renderer invocations. In the first pass only the auxiliary feature buffers for each image of the sequence are generated, as these are required at every frame and pixel. From the data of that first pass, a maximum image gap for each of the tiles can be estimated, i.e. the interpolation interval, and rendering masks can be generated. It is noted that the expression "maximum image gap" refers to the maximum gap from a rendered image that is allowed when choosing the regions to render. It may be that the actual interval used is smaller than maximum image gap. In the second rendering pass the rendering masks can be used to render the necessary regions that it is necessary to render because interpolation of those regions is predicted to provide less desirable results, i.e., partially rendering the intermediate image, then frame interpolation can be used for the remainder the intermediate image. An overview of the method during inference is shown in section c) of FIG. 2.

Implicit Error Prediction:

In order to choose an optimal interpolation interval, first a prediction of how well the final interpolation network would perform can be made from just the auxiliary feature buffers, choosing albedo, depth, and velocity as inputs. It is observed that the optical flow estimation network relies significantly more on the buffer information than the color channel. As a result, by passing zeros as the color channel a good approximation of the final flow may be obtained. Warping and a VGG-style network can be used to regress an implicit error map $\delta_t^m \in (0,1)$ at $1/16$ of the original resolution. Training may be performed by minimizing the following loss:

$$\mathcal{L}_{Error} = \mathcal{L}_{image}(\hat{I}_t \cdot (1 - \delta_t^m) + I_t \cdot \delta_t^m, I_t) + \lambda \cdot \|\delta_t^m\|_2^2 \quad \text{(Equation 11a)}$$

$$\delta_t^m = \delta_t(A_0, A_t, A_1) \quad \text{(Equation 11b)}$$

where $\hat{I}_t$ is the interpolation result, $I_t$ is the ground truth image at time t, and $\mathcal{L}_{image}$ is the chosen image loss. It is noted once again that the error prediction model $\delta_t$ takes only the auxiliary features, i.e., features from the auxiliary buffers $A_0$, $A_t$, and $A_1$ as input.

The error prediction model $\delta_t$ shares many elements with the main method described above. Context features are extracted and splatted using the same optical flow model and warping technique. When computing the optical flow for the error network, zeros are passed for the color channels as they are not available. Nevertheless, this produces a good approximation of the final motion. From the warped context features and the magnitude of velocity vectors $\|v_t\|_2$, a VGG-style network with a sigmoid activation as a last layer can be used to predict the error map.

The error prediction is an implicit error map because, in contrast to some conventional approaches, direct error regression (using Equation 11a) is not performed. A significant advantage to the implicit error prediction disclosed by the present application is that error metrics typically depend on the values of the color, which are not available for the error-prediction network thus are hard to match. Additionally, the implicit error map can be trained with the same image losses as the interpolation network, even when they do not provide per-pixel errors.

Interval Estimation and Mask Generation:

The interpolation interval for each of the images to be interpolated may be defined as the maximum rendered image interval that allows interpolating that image, while the error remains below a given threshold $p \in (0, 1)$. More formally, the interval at a pixel/region x is defined as:

$$\text{interval}_t[x] = \arg\max_{k \in \mathbb{Z} \wedge 0 \leq k \leq K} \delta_t^k[x] < p \quad \text{(Equation 12a)}$$

$$\text{with } \delta_t^k = \delta_t(A_{t-k}, A_t, A_{t+k}) \text{ for } k > 0 \quad \text{(Equation 12b)}$$

with k=0 indicating no interpolation (i.e., always rendering) and hence $\delta_t^0 = 0$. K=25 may be a chosen maximum one-sided interval. If one of the input images does not exist (e.g., image sequence beginning and end), is set to It is noted that, in terms of control, the threshold p can be varied to balance between interpolation quality and speed.

Figure 4:
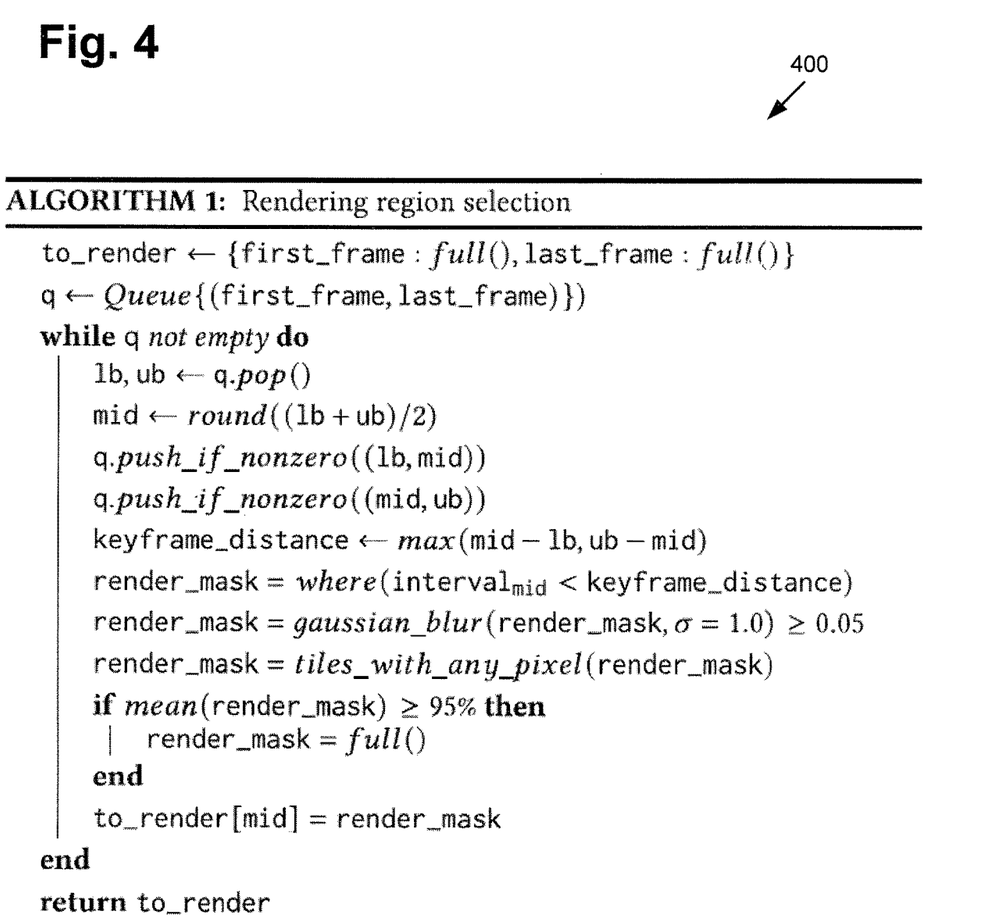
FIG. 4 shows pseudocode of an algorithm for use in performing kernel-based frame interpolation for spatio-temporally adaptive rendering, according to one implementation.

To generate masks, the first and the last frame to be rendered are marked. The middle frame is then selected. For that middle frame, any pixel x that has an interpolation interval $\text{interval}_t[x]$ smaller than the distance to the rendered frame is selected for rendering. Pixel wise masks are then converted to tiles by expanding their boundaries with a Gaussian kernel, and marking every 64×64 tile with at least one marked pixel. After this, the middle frame can be considered ready, and we the resulting two sub-sequences are processed in the same manner. A more formal description of the region selection is provided in Algorithm 1, pseudo-code 400, which is shown in FIG. 4. After having rendered the necessary regions, the same process is repeated to choose the target images to be interpolated and their respective rendered images for performing the interpolation.

Kernel Estimation:

The kernel estimation approach may be simplified by combining the scaling and offset prediction with the key and query estimation, instead of using a separate network. In addition, optionally sinusoidal positional encodings to keys and queries may be added, squared L2 may be used, and a Gaussian distance term with per-pixel estimated standard deviation may be added.

Direct Prediction Basis:

Prior methods have shown that directly predicting large and dense kernels performs well for many tasks such as image denoising and frame interpolation with kernels that also perform motion compensation. However, in order to be able to fill large holes, e.g., fifty pixels from the nearest valid pixel, with such methods would require estimating and applying a N×101×101 kernel everywhere, resulting in the present frame interpolation solution adopting a dynamic kernel prediction approach.

A further extension is to combine both approaches and directly predict only a small size per-pixel basis which are added to the dynamically estimated weights, and defining the new weighting as:

$$\tilde{w}_{yx}^i = w_{yx}^i + d_{yx}^i \qquad \text{(Equation 13a)}$$

$$d_{yx}^i = \begin{cases} \phi_d(y)_{xr}, & \text{if } \|y-x\|_\infty <= D \\ \phi_d(y)_{DC}, & \text{otherwise} \end{cases} \qquad \text{(Equation 13b)}$$

where D is the maximum direct basis offset and $\phi_d(y) \in \mathbb{R}^{(2 \cdot D+1)^2+1}$ is the per-pixel predicted kernel and DC value that is added to the remaining elements.

Multi-Scale Kernel Estimation:

A possible extension for a kernel predicting approach is predicting kernels on multiple scales of the image. For the use cases addressed by the present application, special care needs to be taken to handle holes in the inputs and per-level outputs.

Lower l-th level images, features and masks ($\hat{I}_i^l$, $M_i^l$) can be computed by applying a low-pass Gaussian filter $\mathcal{G}$ to larger resolution image $\hat{I}_i^{l-1}$, downsample, and normalize with the equally processed mask.

$$\bar{M}_i^l[x] = \mathcal{G}(M_i^{l-1})[2 \cdot x] \qquad \text{(Equation 14a)}$$

$$\hat{I}_i^l[x] = \frac{\mathcal{G}(\hat{I}_i^{l-1})[2 \cdot x]}{\bar{M}_i^l[x] + \varepsilon} \qquad \text{(Equation 14b)}$$

$$M_i^l[x] = \frac{\bar{M}_i^l[x]}{\bar{M}_i^l[x] + \varepsilon} \qquad \text{(Equation 14c)}$$

With the obtained inputs, kernels can be estimated and applied as usual. As the last step, lower resolution inputs can be bi-linearly upscaled and merged with per-pixel per-level predicted weighting $\alpha$.

Attention Splatting:

The present frame interpolation solution estimates kernels to be estimated and applied on splatted images and features as defined above in Equation (4). This means that values from different input pixels get aggregated twice, which might not be optimal in some cases, especially with a relatively simple weighting metric and bi-linear splatting kernel.

Described below is a dynamic splatting/attention splatting approach that splats and synthesizes the image in a single operation. Conceptually it can be expressed as redefining the weighting map W discussed above in conjunction with Equations 3(a) and 3(b) as a function on both source and target locations:

$$\mathcal{W}_f(I)[y] = \left(\sum_{x \in \Omega} w(x,y) \cdot I[x]\right) \cdot \left(\sum_{x \in \Omega} w(x,y) + \varepsilon\right)^{-1} \qquad \text{(Equation 15a)}$$

$$w(x,y) = W(x,y) \cdot k(x+f[x]-y) \qquad \text{(Equation 15b)}$$

To define W the same attention-like scheme used to estimate keys k and queries q may be used:

$$W(x,y) = q_y^T k_x \qquad \text{(Equation 16)}$$

The main difference being that k is estimated on the pre-warped images while q are estimated as before. Alternative weightings can also be used, as described above. Because the distance term can be handled with key/query modifications, a simple box kernel can be used:

$$k(d) = \begin{cases} 1, & \text{if } \|d\|_\infty \leq K \\ 0, & \text{otherwise} \end{cases} \qquad \text{(Equation 17)}$$

where K is chosen per each output pixel such that the output does not have any holes. Alternatively, K can be set small and combined with images synthesis.

As the last step, transformations as defined in Equations 4(a)-4(c) need to be applied to make it numerically stable.

Figure 5A:
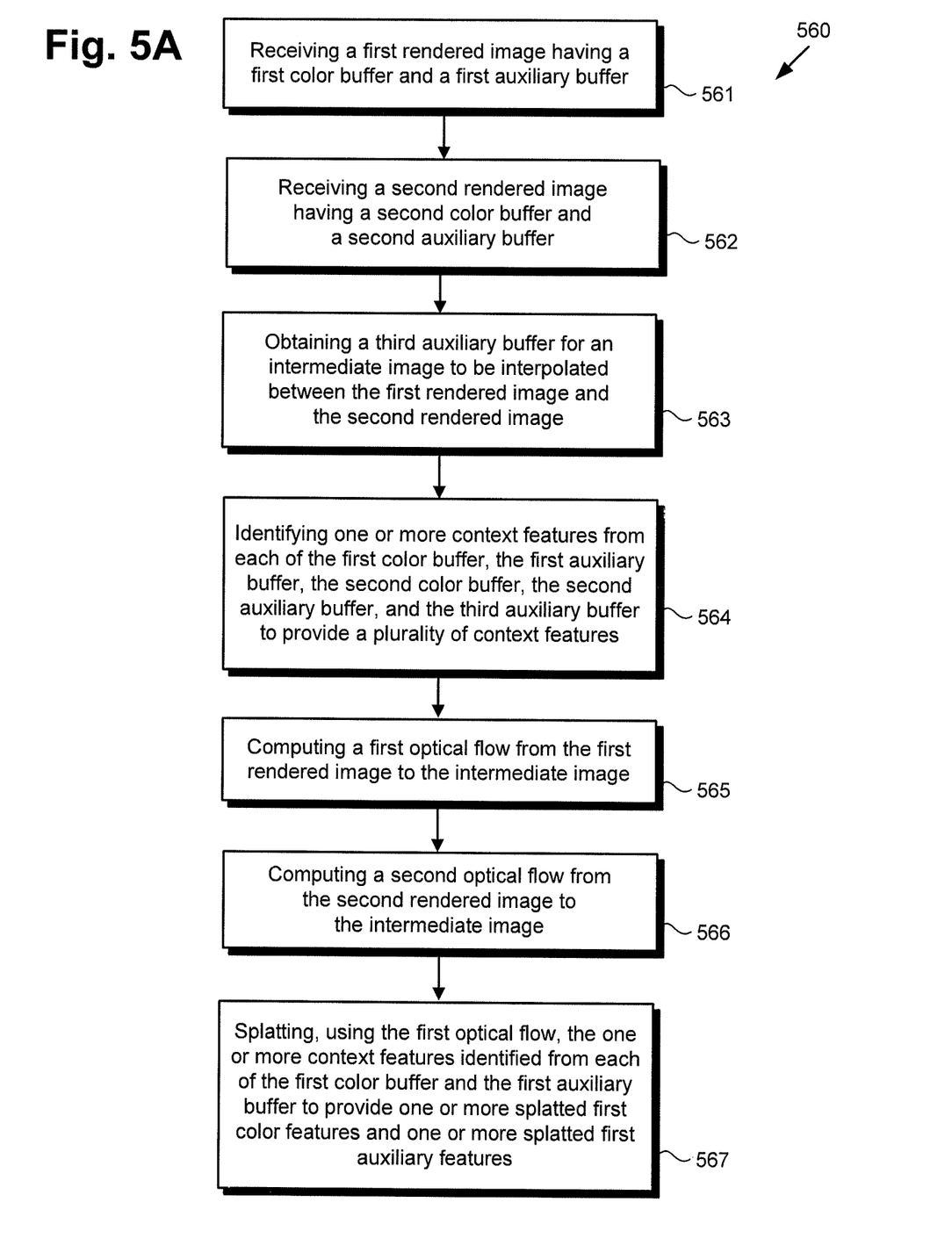
FIGS. 5A and 5B show a flowchart presenting an exemplary method for performing kernel-based frame interpolation for spatio-temporally adaptive rendering, according to one implementation.
Figure 5B:
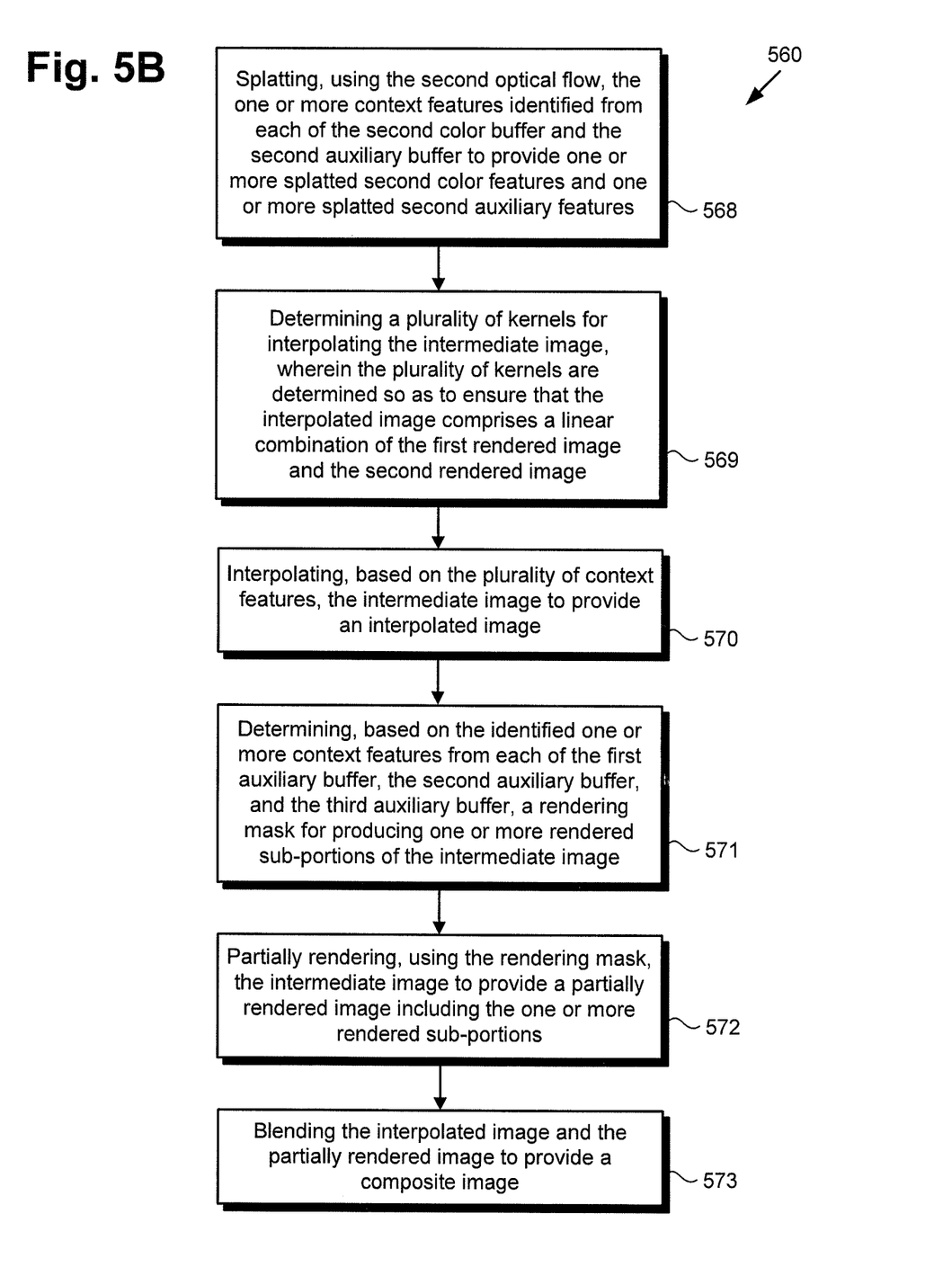

The functionality of system 100 and image interpolation software code 110 will be further described by reference to FIGS. 5A and 5B. FIGS. 5A and 5B show flowchart 560 presenting an exemplary method for performing kernel-based frame interpolation for spatio-temporally adaptive rendering, according to one implementation. With respect to the method outlined in FIGS. 5A and 5B, it is noted that certain details and features have been left out of flowchart 560 in order not to obscure the discussion of the inventive features in the present application.

Referring now to FIG. 5A in combination with FIGS. 1 and 2, flowchart 560 includes receiving first rendered image 132 ($I_0$) having first color buffer $C_0$ and first auxiliary buffer $A_0$ (action 561). As shown in FIG. 1, in some implementations, first rendered image 132 may be a rendered image included in image sequence 130a. For example, image sequence 130a may be a video sequence including first rendered image 132 in the form of a rendered video frame. As further shown in FIG. 1, first rendered image 132 may be received from user system 120 via communication network 118 and network communication links, in action 561, by image interpolation software code 110, executed by hardware processor 104 of system 100.

Continuing to refer to FIGS. 5A, 1, and 2 in combination, flowchart 560 further includes receiving second rendered image 134 ($I_1$) having first color buffer $C_1$ and first auxiliary buffer $A_1$ (action 562). As shown in FIG. 1, in some implementations, second rendered image 134 may be a rendered image included in image sequence 130a. For example, image sequence 130a may be a video sequence including second rendered image 134 in the form of a rendered video frame. Moreover, it is noted that first rendered image 132 and second rendered image 134 may be consecutive rendered images of image sequence 130a, or are at least ordered images in sequence in which first rendered image 132 precedes second rendered image 134. Second rendered image 134 may be received from user system 120 via communication network 118 and network communication links, in action 562, by image interpolation software code 110, executed by hardware processor 104 of system 100.

With respect to the order of actions 561 and 562 depicted in FIG. 5A, it is noted that although flowchart 560 lists action 561 before action 562, that representation is merely exemplary. In other implementations, image sequence 130a including first rendered image 132 and second rendered image 134 may be received by system 100 substantially as a whole. In those implementations, first rendered image 132 and second rendered image 134 may be received in actions 561 and 562 contemporaneously.

Continuing to refer to FIGS. 5A, 1, and 2 in combination, flowchart 560 further includes providing third auxiliary buffer $A_t$ for intermediate image $I_t$ to be interpolated between first rendered image 132 and second rendered image 134 (action 563). Auxiliary buffer $A_t$ may be provided in action 563 by image interpolation software code 110, executed by hardware processor 104 of system 100. For example, Auxiliary buffer $A_t$ may be provided by being generated based on auxiliary buffer $A_0$ of first rendered image 132 and auxiliary buffer $A_1$ of second rendered image 134.

Continuing to refer to FIGS. 5A, 1, and 2 in combination, flowchart 560 further includes identifying one or more context features $\Phi^0$, $\tilde{\Phi}^0$, $\Phi^1$, $\tilde{\Phi}^1$, and $\tilde{\Phi}^t$ from each of first color buffer $C_0$, first auxiliary buffer $A_0$, second color buffer $C_1$, second auxiliary buffer $A_1$, and third auxiliary buffer $A_t$ to provide plurality of context features $\Phi^0$, $\tilde{\Phi}^0$, $\Phi^1$, $\tilde{\Phi}^1$, and $\tilde{\Phi}^t$ (action 564). It is noted that the one or more context features identified from each of the first color buffer and the second color buffer are identified using a first ML model, such as NN 240a for example and the one or more context features identified from each of the first auxiliary buffer, the second auxiliary buffer, and the third auxiliary buffer are identified using a second ML model, such as NN 240b for example.

It is further noted that although the one or more context features identified from each of the first color buffer and the second color buffer are color features, the one or more context features identified from each of the first auxiliary buffer, the second auxiliary buffer, and the third auxiliary buffer, i.e., auxiliary features, may include one or more of albedo, normal, depth, or velocity. The identification of context features $\Phi^0$, $\tilde{\Phi}^0$, $\Phi^1$, $\tilde{\Phi}^1$, and $\tilde{\Phi}^t$ in action 564 may be performed by image interpolation software code 110, executed by hardware processor 104 of system 100.

Continuing to refer to FIGS. 5A, 1, and 2 in combination, flowchart 560 further includes computing first optical flow $f_0$ from first rendered image 132 ($I_0$) to intermediate image $I_t$ (action 565). It is noted that computing first optical flow $f_0$, in action 565 may use one or more motion vectors of first rendered image 132. Action 565 may be performed by image interpolation software code 110, executed by hardware processor 104 of system 100, in the manner described above under section heading Feature Extraction and Warping.

Continuing to refer to FIGS. 5A, 1, and 2 in combination, flowchart 560 further includes computing second optical flow $f_1$ (not explicitly shown in FIG. 2) from second rendered image 134 ($I_1$) to intermediate image $I_t$ (action 566). It is noted that computing second optical flow $f_1$, in action 566 may use one or more motion vectors of second rendered image 134. Like action 565, action 566 may be performed by image interpolation software code 110, executed by hardware processor 104 of system 100, in the manner described above under section heading Feature Extraction and Warping.

It is noted that although flowchart 560 lists action 565 as preceding action 566, that representation is provided merely be way of example. In various implementations, action 566 may follow action 565, may precede action 565, or may be performed in parallel with, i.e., contemporaneously with, action 565.

Continuing to refer to FIGS. 5A, 1, and 2 in combination, flowchart 560 further includes splatting, using first optical flow $f_0$, the one or more context features identified from each of the first color buffer and the first auxiliary buffer in action 564 to provide one or more splatted first color features $S(\Phi^0)$ and one or more splatted first auxiliary features $S(\tilde{\Phi}^0)$ (action 567). Action 567 may be performed by image interpolation software code 110, executed by hardware processor 104 of system 100, in the manner described above under section heading Feature Extraction and Warping.

Referring now to FIGS. 5B, 1, and 2 in combination, flowchart 560 further includes splatting, using second optical flow $f_1$, the one or more context features identified from each of the first color buffer and the first auxiliary buffer in action 564 to provide one or more splatted second color features $S(\Phi^1)$ and one or more splatted second auxiliary features $S(\tilde{\Phi}^1)$ (action 568). Like action 567, action 568 may be performed by image interpolation software code 110, executed by hardware processor 104 of system 100, in the manner described above under section heading Feature Extraction and Warping.

It is noted that although flowchart 560 lists action 567 as preceding action 568, that representation is provided merely be way of example. In various implementations, action 568 may follow action 567, may precede action 567, or may be performed in parallel with, i.e., contemporaneously with, action 567.

Continuing to refer to FIGS. 5B, 1, and 2 in combination, flowchart 560 further includes determining a plurality of kernels for interpolating intermediate image $I_t$, where the plurality of kernels are determined so as to ensure that interpolated image 244 comprises a linear combination of first rendered image 132 and second rendered image 134 (action 569). Action 569 may be performed by image interpolation software code 110, executed by hardware processor 104 of system 100, in the manner described above under section heading Kernel-Based Image Synthesis.

Continuing to refer to FIGS. 5B, 1, and 2 in combination, flowchart 560 further includes interpolating, intermediate image $I_t$ to provide interpolated image 244 (action 570). It is noted that the interpolation performed in action 570 is based on the plurality of context features $\Phi^0$, $\tilde{\Phi}^0$, $\Phi^1$, $\tilde{\Phi}^1$, and $\tilde{\Phi}^t$ identified in action 564 and uses the interpolating the intermediate image to provide the interpolated image uses the one or more splatted first color features $S(\Phi^0)$, the one or more splatted first auxiliary features $S(\tilde{\Phi}^0)$, the one or more splatted second color features $S(\Phi^1)$, and the one or more splatted second auxiliary features $S(\tilde{\Phi}^1)$ provided in actions 567 and 568. In addition, the interpolation performed in action 570 uses the plurality of kernels determined in action 569. Action 570 may be performed by image interpolation software code 110, executed by hardware processor 104 of system 100, in the manner described above under section heading Kernel-Based Image Synthesis.

Continuing to refer to FIGS. 5B, 1, and 2 in combination, flowchart 560 further includes determining, based on the identified one or more context features from each of the first auxiliary buffer, the second auxiliary buffer, and the third auxiliary buffer, in action 564, rendering mask 246 for producing one or more rendered sub-portions of intermediate image $I_t$ (action 571). It is noted that while the determination of rendering mask 246 is based on the one or more context features from each of first auxiliary buffer $A_0$, second auxiliary buffer $A_1$, and third auxiliary buffer $A_t$, identified in action 564, that determination is not based on the one or more context features extracted from either of first color buffer $C_0$ or second color buffer $C_1$.

That is to say, determining rendering mask 246 in action 571 uses the one or more splatted first auxiliary features $S(\tilde{\Phi}^0)$ and the one or more splatted second auxiliary features $S(\tilde{\Phi}^1)$, but does not use the one or more splatted first color features $S(\Phi^0)$ or the one or more splatted second color features $S(\Phi^1)$. It is further noted that determining rendering mask 246 in action 571 may be performed using an ML model. Action 571 may be performed by image interpolation software code 110, executed by hardware processor 104 of system 100, in the manner described above under section heading Adaptive Interpolation.

It is noted that although flowchart 560 lists action 570 as preceding action 571, that representation is provided merely be way of example. In various implementations, action 571 may follow action 570, may precede action 570, or may be performed in parallel with, i.e., contemporaneously with, action 570.

Continuing to refer to FIGS. 5B, 1, and 2 in combination, flowchart 560 further includes partially rendering, using rendering mask 246, intermediate image I$_t$ to provide partially rendered image 248 including the one or more rendered sub-portions (action 572). Action 572 may be performed by image interpolation software code 110, executed by hardware processor 104 of system 100, in the manner described above under section heading Adaptive Interpolation.

It is noted that although flowchart 560 lists action 570 as preceding action 572, that representation is provided merely be way of example. In various implementations, action 572 may occur subsequently to action 570, may precede action 570, or may be performed in parallel with, i.e., contemporaneously with, action 570.

Continuing to refer to FIGS. 5B, 1, and 2 in combination, flowchart 560 further includes blending interpolated image 244 and partially rendered image 248 to provide composite image 150/250 (action 573). It is noted that, in composite image 150/250, the one or more rendered sub-portions of intermediate image I$_t$ overlay interpolated image 244. Action 573 may be performed by image interpolation software code 110, executed by hardware processor 104 of system 100, in the manner described above under section heading Adaptive Interpolation.

Thus, the present application discloses various implementations of systems and methods for performing kernel-based frame interpolation for spatio-temporally adaptive rendering. The frame interpolation solution disclosed by the present application provides production quality frame interpolation results by increasing robustness through an attention-inspired kernel prediction approach. It also significantly improves efficiency through the introduction of spatio-temporal adaptivity. As such, the concepts disclosed in the present application advantageously enable the wider adoption of frame interpolation as a standard tool for enabling cost savings in high quality rendering.

That is to say, the concepts disclosed by the present application advance the state-of-the-art in several ways, including:
Providing a new kernel-based frame interpolation model, that can be applied to an arbitrary number of channels (e.g. alpha) without adapting the method, while increasing robustness to color artifacts;
Identifying an attention inspired mechanism, adapted to frame interpolation, with the ability to dynamically adjust kernel size for filling larger holes in warped rendered images; and
Introducing an adaptive interpolation strategy that includes an implicit interpolation error prediction model, to achieve better results for a given render budget (number of pixels or tiles).

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
a hardware processor; and
a system memory storing a software code;
the hardware processor configured to execute the software code to:
receive a first rendered image having a first color buffer and a first auxiliary buffer;
receive a second rendered image having a second color buffer and a second auxiliary buffer;
provide a third auxiliary buffer for an intermediate image to be interpolated, the intermediate image being between the first rendered image and the second rendered image;
identify one or more context features from each of the first color buffer, the first auxiliary buffer, the second color buffer, the second auxiliary buffer, and the third auxiliary buffer to provide a plurality of context features;
interpolate, based on the plurality of context features, the intermediate image to provide an interpolated image;
determine, based on the identified one or more context features from each of the first auxiliary buffer, the second auxiliary buffer, and the third auxiliary buffer, a rendering mask for producing one or more rendered sub-portions of the intermediate image;
partially render, using the rendering mask, the intermediate image to provide a partially rendered image including the one or more rendered sub-portions; and
blend the interpolated image and the partially rendered image to provide a composite image.

2. The system of claim 1, wherein in the composite image, the one or more rendered sub-portions of the intermediate image overlay the interpolated image.

3. The system of claim 1, wherein the rendering mask is determined using a machine learning (ML) model.

4. The system of claim 1, wherein the one or more context features are identified from each of the first color buffer and the second color buffer using a first ML model, and wherein the one or more context features are identified from each of the first auxiliary buffer, the second auxiliary buffer, and the third auxiliary buffer using a second ML model.

5. The system of claim 1, wherein determining the rendering mask is not based on the one or more context features identified from either of the first color buffer or the second color buffer.

6. The system of claim 1, wherein the one or more context features identified from each of the first auxiliary buffer, the second auxiliary buffer, and the third auxiliary buffer comprise one or more of albedo, normal, depth, or velocity.

7. The system of claim 1, wherein the hardware processor is further configured to execute the software code to:
determine a plurality of kernels for interpolating the intermediate image, wherein the plurality of kernels are determined so as to ensure that the interpolated image comprises a linear combination of the first rendered image and the second rendered image; and
wherein interpolating the intermediate image to provide the interpolated image comprises using the plurality of kernels.

8. The system of claim 1, wherein the hardware processor is further configured to execute the software code to:
compute a first optical flow from the first rendered image to the intermediate image;

compute a second optical flow from the second rendered image to the intermediate image;

splat, using the first optical flow, the one or more context features identified from each of the first color buffer and the first auxiliary buffer to provide one or more splatted first color features and one or more splatted first auxiliary features; and splat, using the second optical flow, the one or more context features identified from each of the second color buffer and the second auxiliary buffer to provide one or more splatted second color features and one or more splatted second auxiliary features;

wherein interpolating the intermediate image to provide the interpolated image uses the one or more splatted first color features, the one or more splatted first auxiliary features, the one or more splatted second color features, and the one or more splatted second auxiliary features.

9. The system of claim 8, wherein determining the rendering mask uses the one or more splatted first auxiliary features and the one or more splatted second auxiliary features, and does not use the one or more splatted first color features or the one or more splatted second color features.

10. The system of claim 8, wherein computing the first optical flow uses one or more motion vectors of the first rendered image, and wherein computing the second optical flow uses one or more motion vectors of the second rendered image.

11. A method for use by a system including a hardware processor and a system memory storing a software code, the method comprising:

receiving, by the software code executed by the hardware processor, a first rendered image having a first color buffer and a first auxiliary buffer;

receiving, by the software code executed by the hardware processor, a second rendered image having a second color buffer and a second auxiliary buffer;

providing, by the software code executed by the hardware processor, a third auxiliary buffer for an intermediate image to be interpolated, the intermediate image being between the first rendered image and the second rendered image;

identifying, by the software code executed by the hardware processor, one or more context features from each of the first color buffer, the first auxiliary buffer, the second color buffer, the second auxiliary buffer, and the third auxiliary buffer to provide a plurality of context features;

interpolating, by the software code executed by the hardware processor, based on the plurality of context features, the intermediate image to provide an interpolated image;

determining, by the software code executed by the hardware processor, based on the identified one or more context features from each of the first auxiliary buffer, the second auxiliary buffer, and the third auxiliary buffer, a rendering mask for producing one or more rendered sub-portions of the intermediate image;

partially rendering, by the software code executed by the hardware processor and using the rendering mask, the intermediate image to provide a partially rendered image including the one or more rendered sub-portions; and blending, by the software code executed by the hardware processor, the interpolated image and the partially rendered image to provide a composite image.

12. The method of claim 11, wherein in the composite image, the one or more rendered sub-portions of the intermediate image overlay the interpolated image.

13. The method of claim 11, wherein the rendering mask is determined using a machine learning (ML) model.

14. The method of claim 11, wherein the one or more context features are identified from each of the first color buffer and the second color buffer using a first ML model, and wherein the one or more context features are identified from each of the first auxiliary buffer, the second auxiliary buffer, and the third auxiliary buffer using a second ML model.

15. The method of claim 11, wherein determining the rendering mask is not based on the one or more context features identified from either of the first color buffer or the second color buffer.

16. The method of claim 11, wherein the one or more context features identified from each of the first auxiliary buffer, the second auxiliary buffer, and the third auxiliary buffer comprise one or more of albedo, normal, depth, or velocity.

17. The method of claim 11, further comprising:

determining, by the software code executed by the hardware processor, a plurality of kernels for interpolating the intermediate image, wherein the plurality of kernels are determined so as to ensure that the interpolated image comprises a linear combination of the first rendered image and the second rendered image; and wherein interpolating the intermediate image to provide the interpolated image comprises using the plurality of kernels.

18. The method of claim 11, further comprising:

computing, by the software code executed by the hardware processor, a first optical flow from the first rendered image to the intermediate image;

computing, by the software code executed by the hardware processor, a second optical flow from the second rendered image to the intermediate image;

splatting, by the software code executed by the hardware processor and using the first optical flow, the one or more context features identified from each of the first color buffer and the first auxiliary buffer to provide one or more splatted first color features and one or more splatted first auxiliary features; and splatting, by the software code executed by the hardware processor and using the second optical flow, the one or more context features identified from each of the second color buffer and the second auxiliary buffer to provide one or more splatted second color features and one or more splatted second auxiliary features;

wherein interpolating the intermediate image to provide the interpolated image uses the one or more splatted first color features, the one or more splatted first auxiliary features, the one or more splatted second color features, and the one or more splatted second auxiliary features.

19. The method of claim 18, wherein determining the rendering mask uses the one or more splatted first auxiliary features and the one or more splatted second auxiliary features, and does not use the one or more splatted first color features or the one or more splatted second color features.

20. The method of claim 18, wherein computing the first optical flow uses one or more motion vectors of the first rendered image, and wherein computing the second optical flow uses one or more motion vectors of the second rendered image.

* * * * *